United States Patent [19]

Bragaglia

[11] 4,359,303
[45] Nov. 16, 1982

[54] PLATE-EDGE MACHINING APPARATUS

[76] Inventor: Giorgio Bragaglia, 5, Via Pablo Neruda, Bologna, Italy

[21] Appl. No.: 124,762

[22] Filed: Feb. 26, 1980

[51] Int. Cl.³ .................... B23D 1/8; B23D 1/26; B23D 13/02
[52] U.S. Cl. .................... 409/303; 83/391; 409/319; 409/327; 409/348
[58] Field of Search .......... 409/301, 303, 319, 327, 409/338, 340, 346, 347, 348, 138, 297, 298; 51/37, 40; 125/14; 83/391

[56] References Cited

U.S. PATENT DOCUMENTS

| | | | |
|---|---|---|---|
| 274,565 | 3/1883 | Creque | 409/319 |
| 782,081 | 2/1905 | Stone | 409/348 |
| 1,276,278 | 8/1918 | Smallwood | 83/391 X |
| 1,995,104 | 3/1935 | Morton | 409/327 X |
| 3,040,632 | 6/1962 | Walter et al. | 409/346 |

*Primary Examiner*—Z. R. Bilinsky
*Attorney, Agent, or Firm*—Lowe, King, Price and Becker

[57] ABSTRACT

A plate-edge machining apparatus comprises a workbench for supporting a plate and a movable abutment for positioning the plate border to be machined in a machining position projecting beyond the workbench. The plate is retained by a movable plate holder. A tool carriage is reciprocably movable relative to a fixed sliding guide and carries two machining tools, each tool being associated with a relative edge of the plate border such that both of said edges can be machined.

5 Claims, 18 Drawing Figures

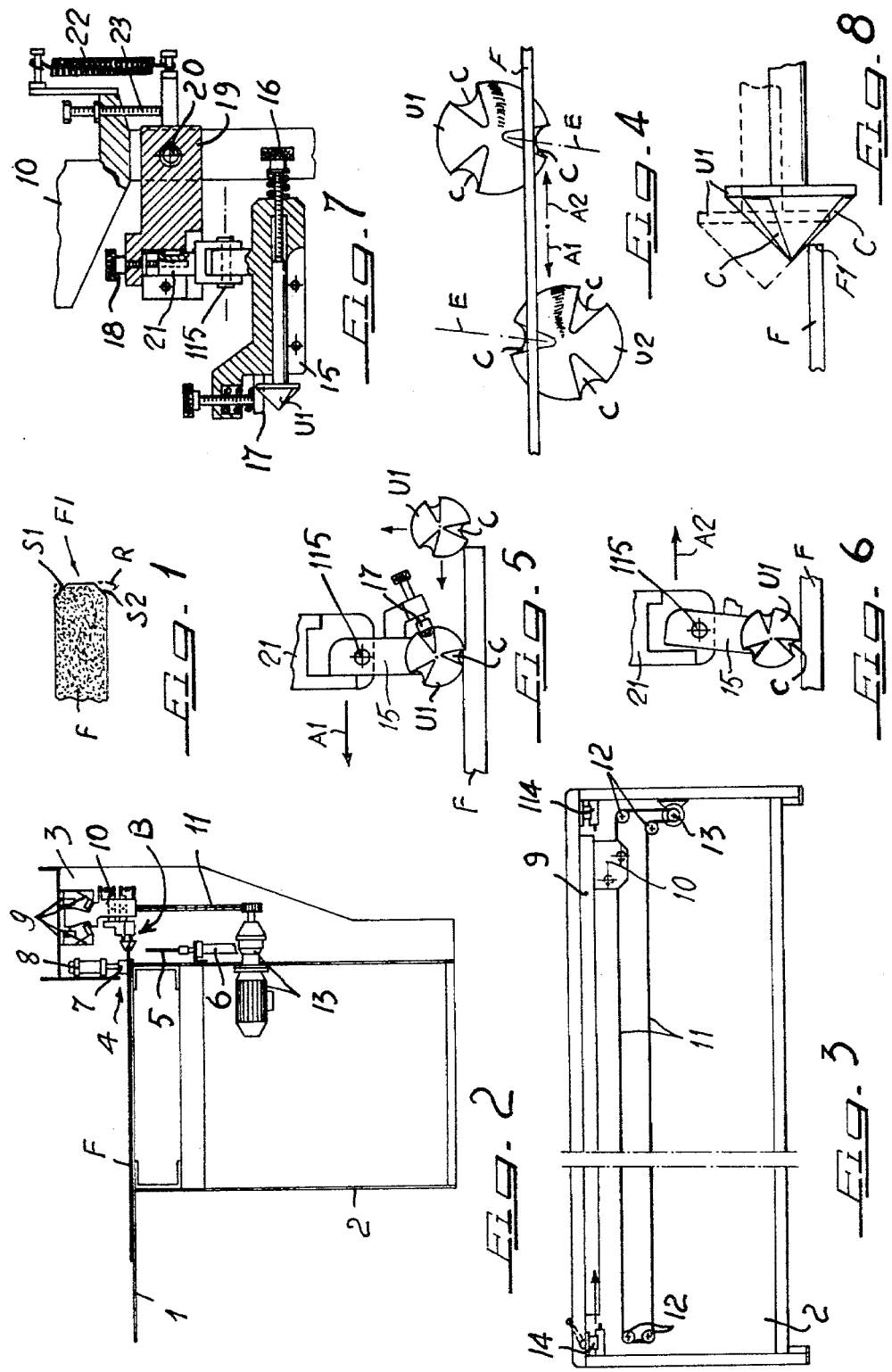

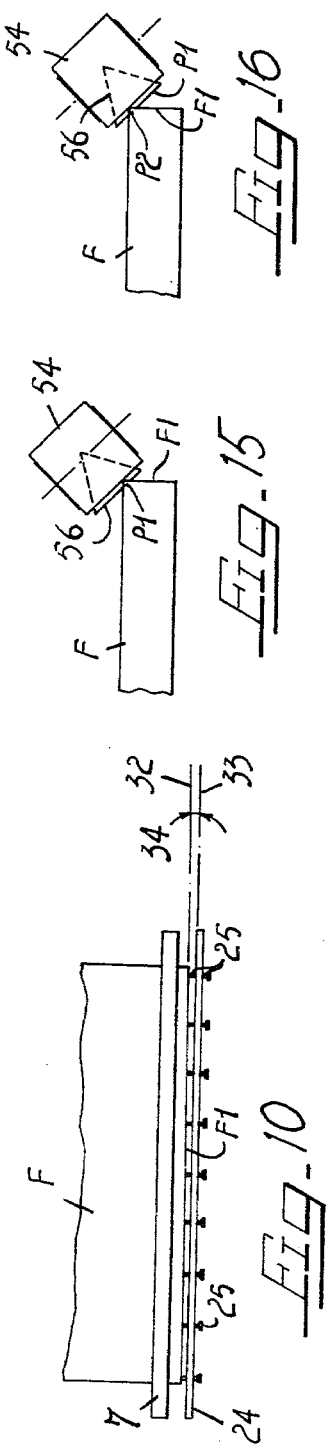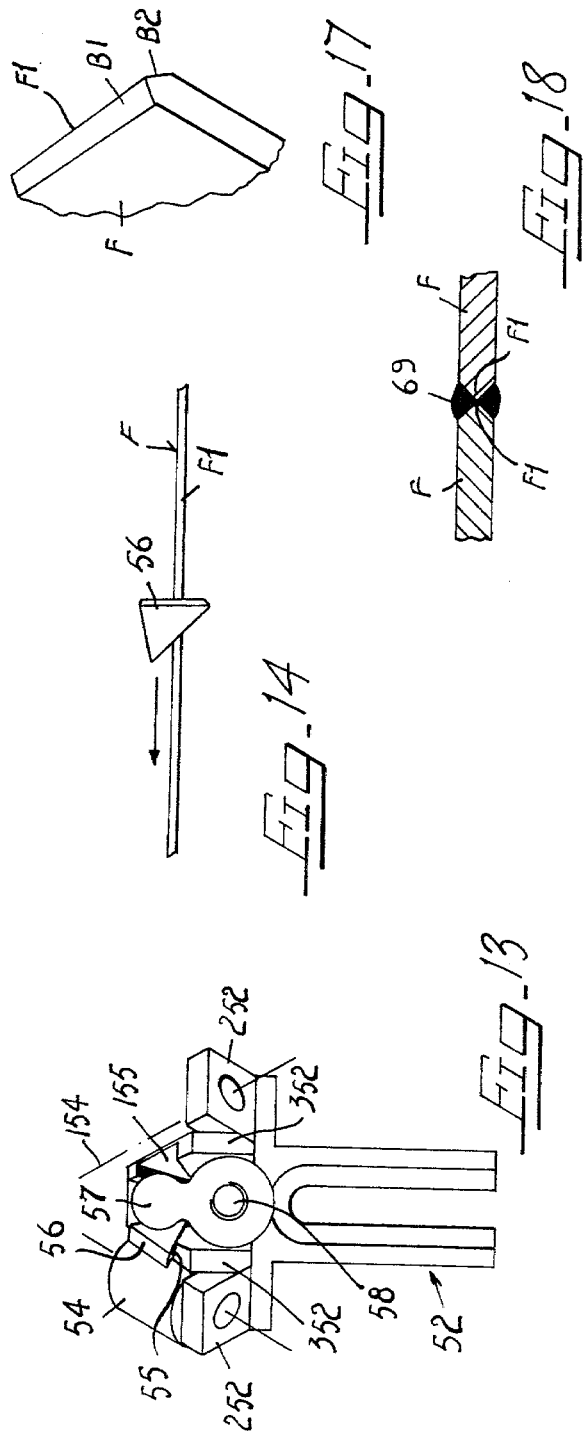

PLATE-EDGE MACHINING APPARATUS

BACKGROUND OF THE INVENTION

The present invention relates to a plate-edge machining apparatus, and more particularly, to a plate-edge deburring machine.

It is an object of the invention to provide a plate-edge machining apparatus which is simple in construction and which can be used to deburr a sheet metal plate quickly and/or for general machining, such as bevelling of the plate edges or preparation thereof for welding.

SUMMARY OF THE INVENTION

According to the invention there is provided, a plate-edge machining apparatus comprises a workbench for supporting a plate to be machined. An alignment stop is adjustable in the plane of the metal plate outside the surface of the bench for positioning the border of the plate to be machined in a machining position protruding from the workbench. A movable plate holder is arranged to hold the metal plate against the workbench in the region of the plate border to be machined. A tool slide or carriage is reciprocably movable relative to a fixed sliding guide parallel to the alignment stop. The tool carriage includes two machining tools each associated with one edge of the plate border to be machined.

The apparatus is capable of machining both edges of a metal plate border during the deburring operation, although only one plate edge usually has a burr requiring deburring. However, the machining of both edges of a plate border obviates the need to locate the edge requiring deburring or to align the corresponding side of the plate on the workbench. As a result, a considerable amount of time is saved during deburring. Moreover, the machine can be used not only for deburring but also for general machining of two edges of a plate border, and particularly for bevelling or rounding off these edges or for preparing the plate border for welding (e.g. for X welds, double Y welds, K welds or the like). Another particular advantage of the invention, both in deburring and also in the general machining of the plate edges, is the simple and rapid positioning and clamping of the metal plate into the machining position.

The machining tools associated with each edge of a metal plate are preferably constructed as planing tools. The planing tools associated with the two plate edges may execute a cutting stroke either simultaneously in both directions of travel of the tool slide or carriage or alternately in opposite directions of the tool slide or carriage. Thus, in the former case, the tool slide or carriage must be moved back and forth once for deburring, whereas in the latter case it need perform only one forward or backward movement.

BRIEF DESCRIPTION OF THE DRAWINGS

Embodiments of the present invention will hereinafter be described, by way of example, with reference to the accompanying drawings, in which:

FIG. 1 shows a metal plate border machined with a machine according to the invention;

FIG. 2 shows a vertical section of a plate-edge machining apparatus according to the invention;

FIG. 3 shows in side view the drive of the tool slide of the machine of FIG. 2;

FIG. 4 shows in front elevation planing tools associated with the two edges of the metal plate border in the machine of FIGS. 2 and 3;

FIGS. 5 and 6 show the positions of a planing tool according to FIG. 4 during the cutting and return strokes;

FIG. 7 shows a vertical section through the clamping means of a planing tool;

FIG. 8 shows in side view a planing tool of FIG. 4;

FIG. 10 shows a top view of an alignment stop for the machine of FIG. 9;

FIG. 13 shows a tool holder of the tool carriage of FIG. 11;

FIG. 14 shows a cutting plate of a planing tool in the machine of FIGS. 9 to 13, in the cutting position relative to the plate edge to be machined;

FIGS. 15 and 16 show a cutting plate and an associated cutting depth limiting roller of a planing tool in the machine of FIGS. 9 to 14, in its starting and finishing positions relative to the plate edge which is to be machined, in the course of a cutting stroke of the planing tool;

FIG. 17 shows diagrammatically a plate edge machined in a V shape using a machine of the invention; and FIG. 18 shows a section of an X weld seam produced with metal plates according to FIG. 17.

DESCRIPTION OF THE PREFERRED EMBODIMENTS

Figure 12:
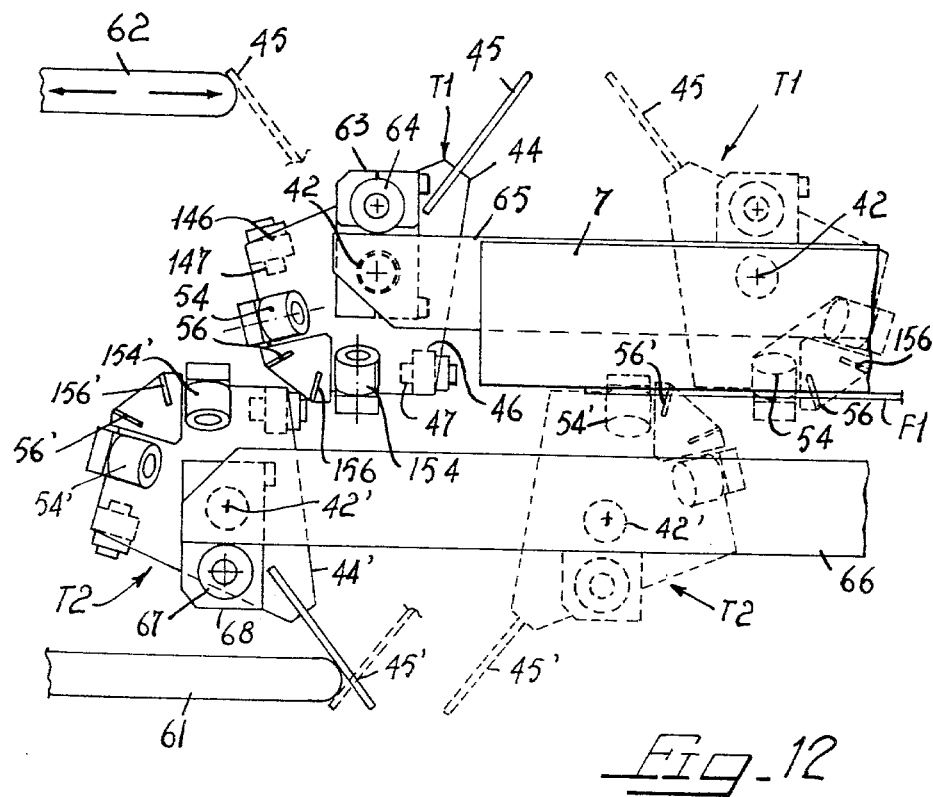
FIG. 12 shows schematically a front view of two planing tools of the machine of FIG. 9.
Figure 9:
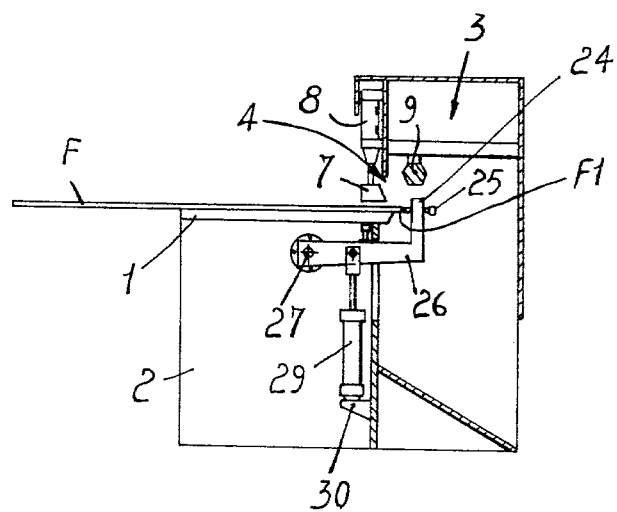
FIG. 9 shows a vertical section of a further embodiment of a plate-edge machining apparatus according to the invention.

The plate-edge machining apparatus or plate-edge deburring machine shown in FIGS. 2 to 8 comprises a horizontal workbench 1 supported by a machine frame 2. In the region of one long side of the workbench 1 there is provided a covering hood 3 which projects partially over the workbench 1. A metal plate F is placed on the workbench 1 and is inserted with its plate edge F1 which is to be machined or deburred, under the covering hood 3 through a lateral opening 4 therein. Associated with the longitudinal edge of the workbench 1 over which the covering hood 3 projects an abutment strip 5 is mounted so as to be movable vertically up and down below the plane of the bench 1. The abutment strip 5 can be raised and lowered by means of pressure cylinders 6. Before metal plate F is positioned the hood 3, abutment strip 5 is raised to a level somewhat above the plane of workbench 1. The metal plate F is then inserted until its edge F1 to be machined or deburred meets the raised abutment strip 5 for alignment (i.e. held in a machining position in which the plate edge F1 which is to be machined or deburred projects freely beyond the workbench 1). In this machining position, the metal plate F is held on the workbench 1, as close as possible to the projecting plate edge F1, by means of a pressing strip 7 which is movable up and down by means of pressure cylinders 8, and is clamped in position. The abutment strip 5 is then lowered and thus exposes the projecting plate edge F1 for the machining or deburring process.

A fixed horizontal sliding guide 9 extending parallel to abutment strip 5 is provided beneath the covering hood 3. A tool carriage 10 is mounted so as to be movable back and forth on sliding guide 9. A toothed belt 11 passes around guide wheels 12 and a drive wheel driven by a geared motor 13. The upper run of belt 11 extends parallel to the sliding guide 9. The tool carriage 10 is connected to the upper run of toothed belt 11. The direction of rotation of the geared motor 13 is reversed by means of limit switches 14 and 114 actuated by tool carriage 10. Thus, by means of the toothed belt 11, the tool carriage 10 is moved back and forth along the sliding guide 9, while the control means for the machine can be programmed so that, depending on the tools mounted on the tool carriage 10 or the desired type of machining, the tool carriage 10 is moved back or forth only once (i.e. in the direction of arrow A1 or A2), or executes one or more movements back and forth in the directions of arrows A1 and A2.

A tool head B is mounted on the tool carriage 10. Tool head B comprises two planing tools U1 and U2 respectively associated with one side S1 and S2 of the plate edge F1 to be machined. Each planing tool U1, U2 is conically shaped and aligned with its cone axis parallel to the plane of plate F and at right angles to machined plate edge F1. Moreover, the cone axis of each planing tool U1 or U2 is located at a spacing from the metal plate F on the side of the associated plate edge S1 or S2. The planing tool U1 associated with the upper plate edge S1 is thus arranged with its cone axis above the plate F, as shown in FIGS. 4, 5, 6 and 8, in particular. On the other hand, the cone axis of the other planing tool U2 associated with the lower plate edge S2 is located below the plate F.

Each planing tool U1 and U2 comprises, in the circumferential surface of its conical body, three cutting grooves C arranged at angular intervals of 120° from one another and each extending along a generating line of the circumferential surface of this body.

Each planing tool U1 and U2 is mounted with its shank so as to be rotatable and longitudinally movable in a tool holder 15, but during operation is held so as to be both non-rotatable and also immovable. Longitudinal displacement of the planing tool U1 or U2 may, for example, be achieved in conjunction with a spring by means of an adjusting screw 16 protruding from the back of the tool holder 15, as shown in FIG. 7, in particular, with respect to the upper planing tool U1. On the other hand, rotation of the planing tool U1 or U2 can be prevented by means of a locking member 17 provided on the tool holder 15 and capable of engaging a cutting groove C of the planing tool. In addition, the tool holder 15 may also be constructed as a clamping holder.

The tool holder 15 of each planing tool U1 or U2 is hinged to a tool holder 21 so as to be pivotable about a rotation axis 115 parallel to the tool axis, while the tool holder 21 is mounted in a rocking lever 19 so as to be non-rotatable but capable of moving up and down by means of an adjusting screw 18. This rocking lever 19 is mounted in the tool carriage 10 about a rotation axis 20 parallel to the plate edge F1 and is acted on by a spring 22 so that the tool carrier 21 with the tool holder 15 is urged towards the plate edge F1 which is to be machined. This movement of the rocking lever 19 under the action of the spring 22 is limited by an adjustable stop screw 23. The mounting of the tool holder 15 in the tool carriage 10 as described above is shown in FIG. 7, in relation to the upper planing tool U1. The lower planing tool U2 is similarly mounted.

In the plate-edge machining apparatus shown in FIGS. 2 to 8, when tool carriage 10 is moved in direction A1, the upper edge S1 of the plate edge F1 is machined by the associated upper planing tool U1. When the tool carriage 10 is moved in the opposite direction A2, the lower edge S2 of the plate edge F1 is machined by the associated lower planing tool U2. Each planing tool U1, U2 is set in an angular position and held by means of the locking member 17 in such a way that a cutting groove C moves into engagement with the associated plate-edge S1, S2. The central longitudinal axis E of the cutting groove C which is in the cutting position is inclined forwards towards the metal plate F in the direction of cutting A1 or A2 of the relevant planing tool U1, U2 as shown in FIG. 4. Consequently, in the direction of travel A1 of the tool carriage 10, only the rear cutting edge of cutting groove C of planing tool U1 which is in the cutting position engages in a machining position with respect to the associated upper plate-edge S1, while the front cutting edge of cutting groove C in this direction A1 abuts on the unmachined portion of the upper plate-edge S1 and acts as a cutting depth limiter, as illustrated in FIG. 5. As the cutting groove attacks the associated upper plate edge S1, the upper planing tool U1 is raised from the lower resting position (cf. right hand side of FIG. 5) into the cutting position (cf. left hand side of FIG. 5), by the pivoting of rocking lever 19 against the bias of spring 22. The pivotable tool holder 15 of upper planing tool U1 moves into abutment with part of the tool carrier 21 and thereby transmits the cutting forces from the tool carriage 10 to the upper planing tool U1.

When the tool carriage 10 moves in the opposite direction of travel A2, the lower planing tool U2 moves into machining engagement with the associated lower edge S2 of the plate edge F1 which is to be machined, in the manner described above. On the other hand, the tool holder 15 of the upper planing tool U1 is raised from the abutment of the tool carrier 21 and is pivoted backwards about the axis 115, as shown in FIG. 6. Consequently, in the direction of travel A2 of tool carriage 10, the upper planing tool U1 is pulled along in ductile manner, with no effect, while the lower planing tool U2 performs its cutting stroke.

After one back and forth movement of the tool carriage 10, the machined plate edge F1 is specifically deburred, irrespective of whether the burr R is located on the upper edge S1 or—as shown by broken lines in FIG. 1—on the lower edge S2 of the plate edge F1, since the two edges S1 and S2 are planed one after the other and at the same time bevelled to some extent. If the plate edges S1 and S2 require further machining, i.e. additional bevelling, tool carriage 10 executes additional reciprocating strokes corresponding to the desired degree of machining.

The construction and arrangement of planing tools U1, U2 as described above, advantageously allows the point of contact between the conical planing tool U1, U2 and the respective plate edge S1 or S2 to be varied by axially parallel adjustment of the planing tool in tool holder 15. In FIG. 8, two corresponding positions of the planing tool U1 are shown by broken and continuous lines. In this way, the cutting point of the planing tool U1 or U2 can be adjusted and periodically reset along the rear cutting edge of the cutting groove C which is in the cutting position. As a result, the wear on the planing tool U1 or U2 can be uniformly distributed over the length of the cutting edge. Moreover, after the cutting edge of one cutting groove C has become worn, another cutting groove C can be brought into the cutting position, (i.e. brought into engagement with the associated plate-edge S1 or S2, by rotating the planing tool U1 or U2). The planing tools U1, U2 therefore have a long service life and do not require frequent replacement. In addition, because of the mounting of the tool holders 15, it is possible to deburr or machine the edges of metal plates F of different thickness.

The embodiment of a plate-edge machining apparatus shown in FIGS. 9 to 18 corresponds in its general construction to the embodiment shown in FIGS. 2 to 8. Identical or equivalent parts have been given the same reference numerals. The first difference between the two embodiments is that an abutment strip 24 which is temporarily adjustable in the plane of the metal plate F outside the surface of the workbench 1, as discussed above, is fixed to a plurality of rocking levers 26 mounted on the machine frame 2 so as to be pivotable about an axis 27. The rocking levers 26 are pivoted up and down by means of pressure cylinders 29. The plate edge F1 to be aligned and machined does not come into direct contact with the abutment strip 24, but abuts on free, projecting ends of a plurality of stop screws 25 arranged in spaced relation to each other along strip 24 as shown in FIG. 10. Thus, by adjustment of stop screws 25, plate edge F1 can be set in a vertical plane 32 which makes a small angle 34 with a vertical plane 33 parallel to the slide path 9 of the tool carriage 10, as shown in FIG. 10. The advantage of this adjustment is described hereinafter in connection with FIGS. 15 and 16.

Figure 11:
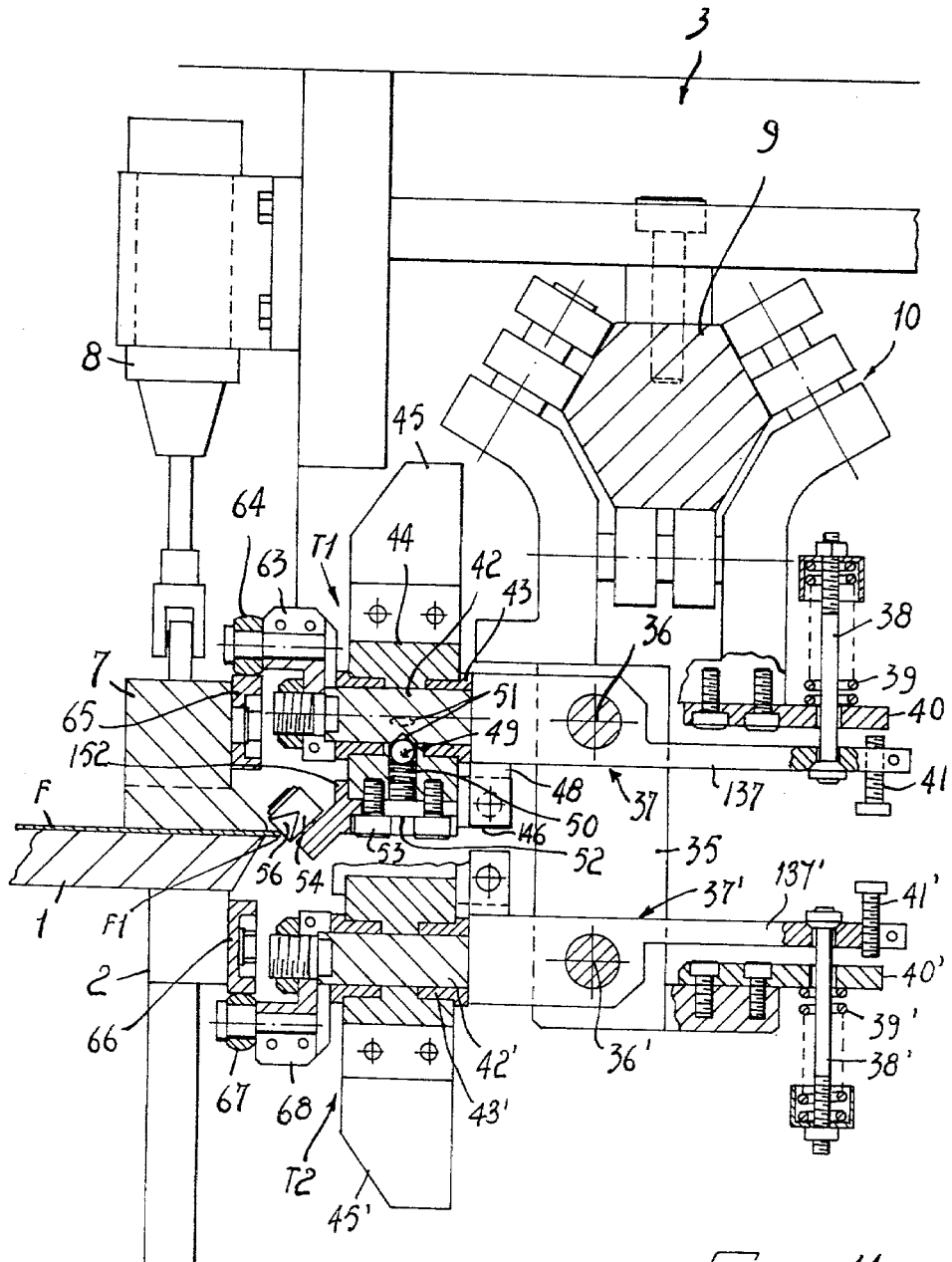
FIG. 11 shows an enlarged vertical section of a tool carriage of the machine of FIG. 9.

The tool carriage 10 movable along the sliding guide 9 is constructed as a tool truck on which there is provided an upper tool head T1 associated with the upper edge S1 of plate border F1 and a lower tool head T2 associated with the lower edge S2 of the plate border. Each tool head T1 or T2 consists of a rocking lever 37 or 37' mounted on a part 35 of tool carriage 10 so as to be pivotable about an axis 36 or 36' parallel to the slide path, as shown in FIGS. 11 and 12. A spring 39 or 39' engages, through a tension rod 38 or 38', on that end 137 or 137' of the associated rocking lever 37 or 37' which is remote from the plate F. Each spring 39, 39' urges the opposite end of associated rocking lever 37, 37' projecting relative to the plate F, towards the plane of the plate. This pivoting movement of the rocking lever 37 or 37' is, however, limited by a stop screw 41 or 41' which is mounted on the rocking lever and cooperates with a stop 40 or 40' on the tool carriage 10.

At its opposite end near to the metal plate F, each rocking lever 37 or 37' comprises a substantially horizontal pin 42 or 42' which extends at right angles to the sliding guide 9 or to the stop strip 24. A tool carrier 44 or 44' which forms the associated tool head T1 or T2 is rotatably mounted on this pin 42 or 42', via interposed bearing bushings 43 or 43'. A tool holder with two cutting plates 56, 156 or 56', 156' is fixed to that side of the tool carrier 44 or 44' facing the metal plate F. The two cutting plates 56, 156 or 56', 156' are located between two rollers 54, 154 or 54', 154' acting as cutting depth limiters, which are mounted in a freely rotatable manner on the associated tool carrier 44 or 44'.

The tool holder with the cutting plates 56, 156 and the cutting depth limiting rollers 54, 154 will only be described with regard to the upper tool head (see FIG. 13). This tool holder consists of a fork-shaped member 52 inserted into corresponding recesses in tool carrier 44 and held in this position with screws 53. On its end facing the metal plate F, the tool holder 52 has two projecting flaps 252 carrying the cutting depth limiting rollers 54, 154. Between rollers 54, 154 the tool holder 52 comprises projecting ribs 352 with holding means 55, 155 for the insertion of cutting plates 56, 156. Cutting plates 56, 156 are clamped in position with a clamping bracket 57 attached to tool holder 52 with screw 58. The tool holder of the lower tool head T2 is constructed accordingly.

The machine shown in FIGS. 9 to 18 is constructed so that, with each reciprocating stroke of tool carriage 10 (i.e. in the directions of travel A1, A2), both edges S1, S2 of plate border F1 are simultaneously machined by the associated tool heads T1 and T2. When tool carriage 10 moves to the left in FIG. 12, tool carriers 44 or 44' which are pivotable on pins 42 or 42' assume the angular position shown by broken lines. One cutting plate 56 or 56' of the two tool heads T1 or T2 is then in machining engagement with the associated edge S1 or S2 of the plate border F1, while a leading roller 54 or 54' travels on the portion of the associated plate edge S1 or S2 yet to be machined. Rollers 54 and 54' determine the trailing cutting depth of the cutting plate 56 or 56'.

At the end of this cutting stroke provided with tool carriage 10, a projecting blade 45', for example, of lower tool carrier T2, contacts a fixed stop 61. Consequently, lower tool carrier T2 tilts about its pivot axis 42' and moves into an angular position, as shown by continuous lines in FIG. 12. In this position, the cutting plate 156' moves into machining engagement with the associated lower plate edge S2 and the cutting depth limiting roller 154' is in the working position. On the other hand, the upper tool head T1 is associated with a reciprocally movable control member 62 which cooperates with a blade 45 of the tool carrier 44 and at the same time as the lower tool carrier 44' is pivoted, or shortly before or after this pivoting, is briefly moved so that it also tilts the upper tool carrier 44 about its pivot axis 45 into the angular position shown by continuous lines in FIG. 12. In this way, the other cutting plate 156, together with the corresponding cutting depth limiting roller 154, comes into engagement with the associated upper plate edge S1. During subsequent movement of the tool carriage 10 (to the right in FIG. 12), tool carriers 44, 44' stay in the angular positions shown by solid lines. Simultaneously, the two edges S1 and S2 of a new plate border F1 are machined are planed by means of the cutting plates 156, 156'. At the end of this stroke of the tool carriage, the tool carriers 44, 44' of the two tool heads T1, T2 are tilted back into their angular positions, as shown by broken lines in FIG. 12 in the manner described above, so that when tool carriage 10 travels back to the left in FIG. 12 the cutting plates 56, 56' are in the cutting position.

The tiltable tool carriers 44 and 44' are held in their end positions by means of abutment flaps 46, 146 which are provided with stop screws 47 and 147 and cooperate with a stop 48 fixed to the rocking lever 37, as shown particularly in FIGS. 11 and 12 in relation to the tool carrier 44 of the upper tool head T1. Moreover, in the tool carrier 44 or 44', there may be provided a radially adjustable stop ball 49 loaded by a spring 50. Stop ball 49 cooperates with associated detents 51, corresponding to the two angular positions of tool carrier 44 or 44', in the appropriate pin 42 or 42'.

The cutting plates 56, 56', 156, 156' are formed as equilateral triangles and each of their sides is constructed as cutting edges. After one side of the triangle has become worn, the other two can be used by moving the cutting plate round accordingly. The cutting plate, such as 56, which is in the cutting position is arranged at an angle so that when it cuts in, its cutting edge which is engaging with the associated edge of the plate edge F1 is inclined relative to the machined plate edge, both in the longitudinal direction of the plate border F1 (FIG. 14) and also at right angles to the plate border F1 (FIGS. 15 and 16). The inclination of the cutting edge of the cutting plate 56 relative to the machined plate edge at right angles to the associated plate border F1, as shown in FIGS. 15 and 16, is very advantageous, particularly in connection with the inclination, shown in plan view in FIG. 10, between the vertical plane 32 through the plate border F1, on the one hand, and the vertical plane 33 through the abutment strip 24 or the sliding guide 9 for the tool carriage 10, on the other hand. In fact, when these two inclinations are combined, during the movement of the tool carriage 10 the point of contact between the plate edge and the cutting edge of the cutting plate 56 moves along this cutting edge from an end position P1 (FIG. 15) to the opposite end position P2 (FIG. 16) and vice versa, depending on the direction of travel of the tool carriage 10. In this way, the cutting edge of the cutting plate 56 is worn evenly along its entire length. Furthermore, better cutting action is obtained and heating of cutting plate 56 is reduced.

In order to deburr a plate border F1, the tool carriage 10 generally only has to be moved once in one direction of travel. With a plurality of back and forth movements of the tool carriage 10, which may be programmed and carried out automatically, the two edges B1 and B2 of the plate border F1 can be bevelled as shown in FIG. 17, and prepared for the production of a weld seam, e.g. an X-shaped weld seam 79, as shown in FIG. 18.

The automatic matching of the machine of FIGS. 9 to 18 to metal plates F of different thicknesses can be promoted or obtained if guide rails 65, 66, respectively, extending over the full length of the machine, are fixed to the sides of the pressing strip 7 and the underlying machine frame 2 which face the tool carriage 10. Projecting over the guide rail 65 which is fixed to the pressing strip 7 is a roller 64 which is mounted in a freely rotatable manner an arm 63 connected in non-rotatable manner to the pin 42 of the upper tool carrier 44. A radial arm 68 which carries a roller 67 engaging under the guide rail 66 on the machine frame 2 is also fixed to the pin 42' of the lower tool carrier 44'. The upper edge of the upper guide rail 65 and the lower edge of the lower guide rail 66 are arranged so that the rocking levers 37, 37' rest on the guide rails 65 or 66 under the action of the springs 39, 39' via the rollers 64 or 67, at both ends of the tool carriage stroke. However, when the cutting depth limiting roller 54 or 145, or 54' or 154' advances towards the associated plate edge at the start of each stroke of the tool carriage, the cutting depth limiting roller raises the corresponding rocking lever 37 or 37' against the bias of spring 39 or 39' until rollers 64, 67 lift away from the guide rollers 65, 66 and the plate edges are planed only by the cooperation of the two cutting plates 56 and 56' or 156 and 156' with the cutting depth limiting rollers 54 and 54' or 154 and 154' mounted in front of them, via the action of the two springs 39 and 39'. However, due to guide rails 65 and 66, when the particular cutting depth limiting roller 54, 154, 54', 154' reaches the associated plate edge to be machined, this roller is always at the same height relative to the plane of the metal plate. Nevertheless, the guide rails 65, 66 do not affect the cutting depth.

As shown in FIGS. 10, 15 and 16, the upper tool head T1, for example, is lowered somewhat from the end position corresponding to FIG. 15 into the end position corresponding to FIG. 16 when the tool carriage 10 moves along. As a result, the upper edge of upper guide rail 65 fixed to the pressing strip 7 is also slightly inclined in the longitudinal direction from its end corresponding to FIG. 15 to its end corresponding to FIG. 16, so that roller 64 of upper rocking lever 37 remains at the same spacing from the guide rail 65 until the corresponding upper tool head T1 is in engagement with the upper plate edge to be machined. The lower edge of the lower guide rail 66 naturally also has a corresponding inclination in the longitudinal direction.

I claim:

1. Plate edge machining apparatus, comprising means for supporting a metal plate to be machined; alignment stop means operatively connected to the support means, said stop means being movable into a position spaced from the support means for positioning a plate border of the metal plate into a machining position spaced from the support means; a plate holder movably mounted above the support means for pressing the metal plate against the support means in an area adjacent the plate border; a fixed sliding guide extending substantially parallel to the stop means; a tool carriage being reciprocable along the sliding guide; a pair of tool heads each carried by the tool carriage and respectively associated with upper and lower plate border edges to be machined, each tool head including a tool carrier having a pair of cutting plates mounted in spaced relation from each other, a pair of rollers each respectively mounted in a leading position adjacent each one of the cutting plates for limiting the cutting depth of the corresponding cutting plate during the cutting stroke, said cutting plates being mounted between said rollers, means pivotably supporting said tool carrier for pivoting about a tilting axis extending at substantially right angles to the sliding guide and for moving the tool carrier alternately into two angular positions respectively corresponding to a direction of travel of the tool carriage, a cutting plate entering into machining engagement with an associated plate edge in each of said angular position.

2. Apparatus according to claim 1, wherein said pivotable support means includes a rocking lever on the tool slide or carriage to urge the tool carrier by spring means towards the metal plate edge for machining engagement.

3. Apparatus according to claim 2, wherein the rocking lever of each tool head carries an engaging roller roller engageable with a guide rail in the two end positions of the tool slide or carriage, said guide rail being attached to the plate holder above the metal plate or to the support means below the metal plate, said roller being operable to direct an associated tool head after the tool head leaves the plate to be machined and then support the tool head in a starting position located in closer proximity to the support means.

4. Apparatus according to claim 1, wherein each cutting plate is substantially triangular shaped having sides constructed as cutting edges and means for alternately biasing the cutting edges into cutting position.

5. Apparatus according to claim 1, including means for adjusting the plate border to be machined in a vertical plane forming a small angle with a vertical plane passing through the sliding guide of the tool slide or carriage, said cutting edge of the cutting plate being inclined relative to the associated plate edge and at right angles thereto.

* * * * *